(12) United States Patent
Schuler

(10) Patent No.: US 6,443,030 B1
(45) Date of Patent: Sep. 3, 2002

(54) VEHICLE STEERING WHEEL

(75) Inventor: Patrik Schuler, Obernburg (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/598,866

(22) Filed: Jun. 21, 2000

(30) Foreign Application Priority Data

Jun. 23, 1999 (DE) ..................... 299 10 992 U

(51) Int. Cl.⁷ .............................. B62D 1/04; G05G 1/10
(52) U.S. Cl. ......................................... 74/552; 74/558
(58) Field of Search ....................... 74/552, 558, 558.5

(56) References Cited

U.S. PATENT DOCUMENTS

| | | | |
|---|---|---|---|
| 3,576,139 A | | 4/1971 | Conterno |
| 3,726,152 A | * | 4/1973 | Tsuneizumi .................. 74/552 |
| 5,840,144 A | * | 11/1998 | Schumacher et al. |
| 6,012,354 A | * | 1/2000 | Futschik et al. .......... 74/552 X |
| 6,065,366 A | * | 5/2000 | Koyama et al. .............. 74/552 |

FOREIGN PATENT DOCUMENTS

| | | | |
|---|---|---|---|
| DE | 40 39 138 | * | 2/1992 |
| DE | 19717412 | | 7/1998 |
| DE | 29813895 | | 11/1998 |
| JP | 2000-127982 | * | 5/2000 |
| JP | 2000-142424 | * | 5/2000 |

* cited by examiner

*Primary Examiner*—David Fenstermacher
(74) *Attorney, Agent, or Firm*—Tarolli, Sundheim, Covell, Tummino & Szabo L.L.P.

(57) ABSTRACT

The invention relates to a vehicle steering wheel including a steering wheel hub which has an axial direction and a steering wheel rim which has an inner and an outer face and is provided with a foam casing. The steering wheel further includes at least one spoke connecting the steering wheel hub with the steering wheel rim, and an insert which is visible from the exterior on at least one of the inner face facing the steering wheel hub and the outer face facing away therefrom. The insert is a surrounding ring which has first segment sections on a periphery of the steering wheel rim and which are visible from the exterior. The insert further has second segment sections alternating with the first sections. The second sections are not visible from the exterior and are embedded in the foam casing.

12 Claims, 4 Drawing Sheets

VEHICLE STEERING WHEEL

TECHNICAL FIELD

The invention relates to a vehicle steering wheel.

BACKGROUND OF THE INVENTION

Steering wheels with inserts visible from the outside, which increasingly are an imitation of wood, are intended to give the steering wheel an appearance of superior quality and are being requested by the customer with increasing frequency. These steering wheels are almost always covered in leather. The inserts, however, are usually only visible from the exterior over specific segment sections. In fact in the transition region between the steering wheel spokes and the steering wheel rim, no inserts are provided. Hitherto, several inserts have been fastened to the inner or outer face of the steering wheel rim, which form segment sections of this surrounding inner or outer face. The fastening of these inserts to the steering wheel rim or in the foam casing are costly and make the steering wheel expensive.

BRIEF SUMMARY OF THE INVENTION

The invention provides a vehicle steering wheel in which such an insert is fastened substantially better in the steering wheel rim and where the incorporation of the insert is easier and cheaper. This is achieved in a vehicle steering wheel which comprises a steering wheel hub which has an axial direction and a steering wheel rim which has an inner and an outer face and is provided with a foam casing. The steering wheel further comprises at least one spoke connecting the steering wheel hub with the steering wheel rim, and an insert which is visible from the exterior on at least one of the inner face facing the steering wheel hub and the outer face facing away therefrom.

The insert is a surrounding ring which has first segment sections on a periphery of the steering wheel rim, which are visible from the exterior. The insert further has second segment sections alternating with the first sections, the second sections being not visible from the exterior and being embedded in the foam casing. Whereas in the steering wheels hitherto, several inserts were provided and each insert only formed one segment section which is visible from the exterior, in the vehicle steering wheel according to the invention, the insert is a surrounding ring which provides all visible segment sections. The visible segment sections are connected with each other by segment sections which are not visible from the exterior and which are embedded in the foam casing, so that a surrounding, preferably closed ring is the result. The fastening in the steering wheel rim together with the foam casing is substantially simpler, because the segment sections hold each other reciprocally. In addition, also, fewer individual parts are necessary.

In accordance with the preferred embodiment, the second segment sections are staggered radially or axially with respect to the first, visible segment sections, e.g. by being constructed as arcs which are curved axially toward the front face of the steering wheel.

As the insert is only fastened to the vehicle steering wheel after the foam casing has been applied, the foam casing can at least partially serve to secure the insert. The simple installation and arresting of the insert is possible according to the preferred embodiment in that the foam casing has recesses which are adapted to the shape of the insert. These allow an insertion of the insert into these recesses in axial direction of the hub and hence into the foam casing. The second segments are simply pushed into the pocket-like recesses and the insert sits firmly on the steering wheel rim. Of course, additional arrangements can be provided in order to also fasten the insert to the steering wheel skeleton, preferably here to the steering wheel rim. For example, a latching connection can be provided for this, which is formed by the foam casing itself, by the foam casing for example having a projection which holds the insert in the recess.

So that the insertion into these pockets and the foam casing process can take place in a simple manner, the second segment sections preferably have an elongated profile in cross-section in axial direction. The outer and inner faces of the second segment section in this embodiment are substantially cylindrical so that an axial insertion is facilitated. Large undercuts or the like are to be avoided in the second segment sections and in the foam casing in the region of the pockets, because this would make the respective manufacturing process complicated.

The steering wheel according to the invention is preferably covered in leather, the leather covering not allowing the second segment sections to be visible from the exterior. After the introduction of the insert into the pocket-like recesses in the foam casing, the steering wheel rim is closed peripherally by the leather covering in the region of the non-visible second segment sections.

The second segment sections are preferably provided in the region of the transition of the spokes to the steering wheel rim.

DETAILED DESCRIPTION OF THE PREFERRED EMBODIMENTS

Figure 1:
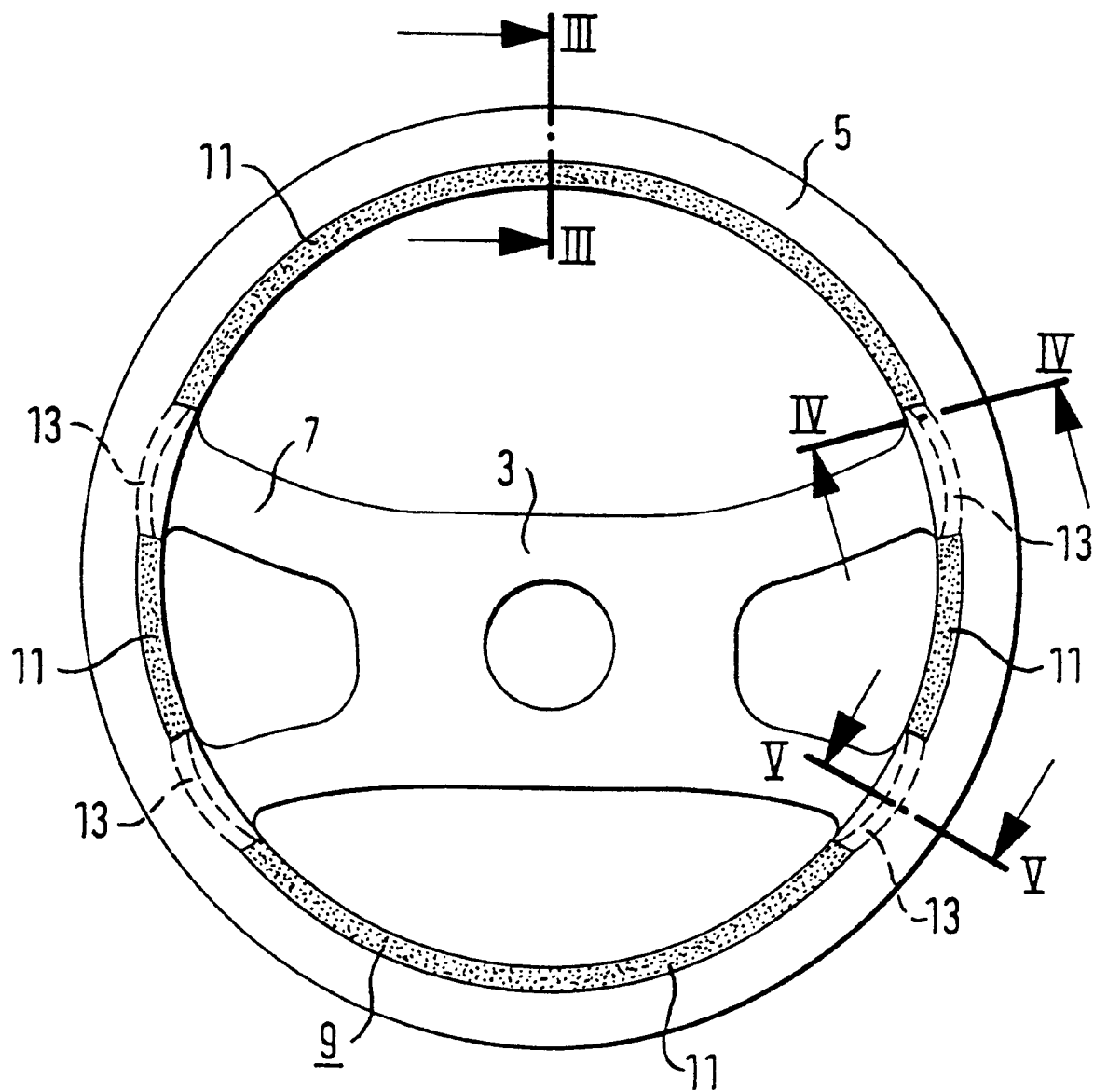
FIG. 1 shows a top view onto a diagrammatically illustrated vehicle steering wheel according to the invention.

In FIG. 1 a vehicle steering wheel is shown, which has a steering wheel hub 3, a steering wheel rim 5 with foam casing and also spokes 7 which connect the steering wheel hub 3 with the steering wheel rim 5. The vehicle steering wheel has a very high-quality appearance, which is achieved in particular by its leather covering and an insert 9 which is visible from the exterior across several circle segments on the inner face of the steering wheel rim 5 facing the steering wheel hub 3. The insert 9 is a plastic ring, closed in circumferential direction, or a ring of another suitable material such as aluminum, wood or composite material which can have an imitation of wood on its visible inner face. The insert 9 has first segment sections 11 which are visible from the exterior and define the inner face of the steering wheel rim, and also second segment sections 13, which are not visible from the exterior and which connect adjacent first segment sections 11 with each other. These second segment sections, which lie in the transition between the steering wheel spokes 7 and the steering wheel rim 5, are substantially narrower in cross-section and are surrounded by the foam casing. As the steering wheel rim 5 is normally to always have the same cross-section on its circumference, the insert 9 must run into the foam casing in the region of the second segment sections 13. This can take place for example in that the second segment sections 13 run in axial direction of the steering wheel hub 3 above or below the plane defined by the first segment sections 11. The second segment sections can extend with respect to the first also radially further outwards and hence into the foam casing.

Preferably the transition between the first and second segment sections 11, 13 is constructed in an arc shape, so that transition contours result which are without shoulders. The part of the steering wheel skeleton forming the steering wheel rim 5 completely encased in foam and covered with leather is designated by 21. If the insert 9 lies in axial direction above the skeleton, i.e. over the part 21 of the steering wheel rim 5, then an arc-shaped transition between the segment sections 11, 13 is not necessary.

Figure 2A:
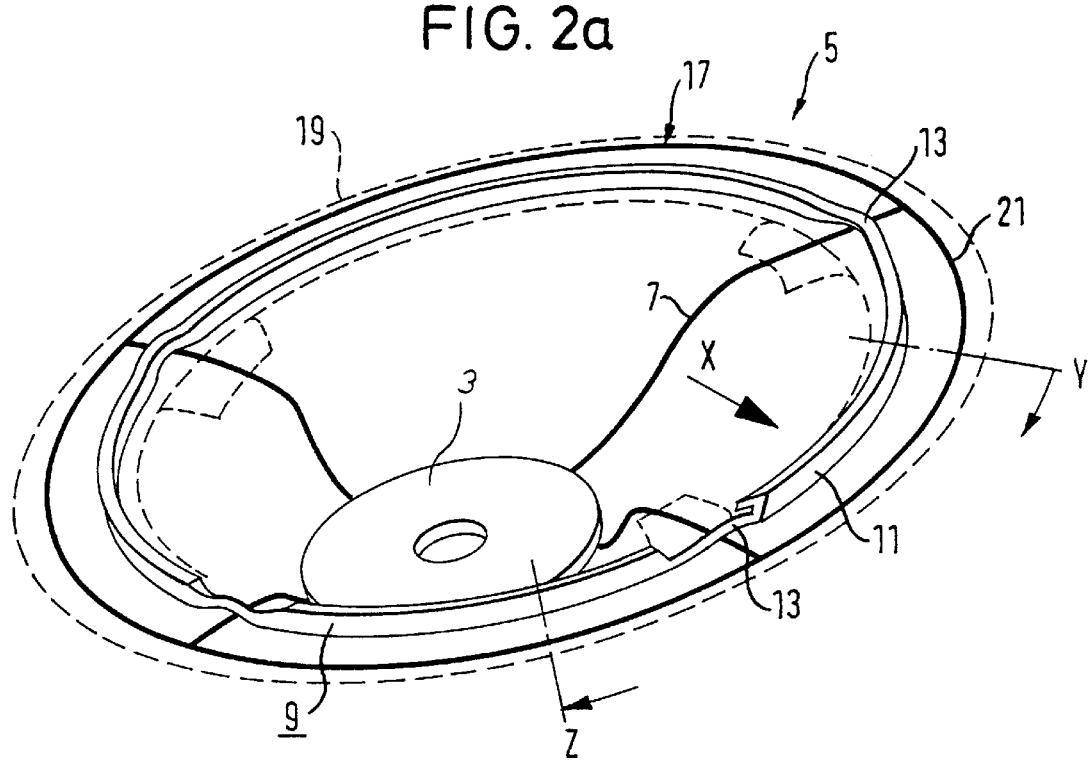
FIG. 2a shows a perspective view onto the insert used in the vehicle steering wheel according to FIG. 1, which is placed onto the steering wheel skeleton used in the steering wheel according to FIG. 1.

In FIG. 2a the insert 9 can be seen better, and the steering wheel skeleton 17, consisting of the part 21 of the steering wheel rim 5 and spokes 7, is also illustrated, so that the geometry of steering wheel skeleton 17 to insert 9 becomes clearer. FIG. 2a shows that the second segment sections 13 run in an arc shape upwards in axial direction and hence lie above the spokes 7, more precisely the skeleton section in the spokes 7. The foam casing 19 to be applied later is indicated by broken lines.

Figure 2B:
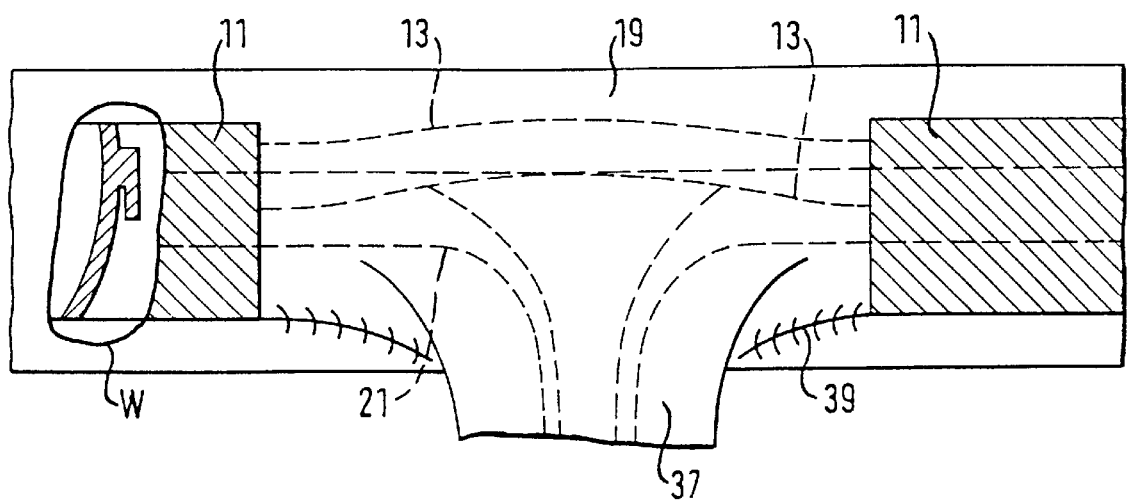
FIG. 2b shows a view in the direction of the arrow X in FIG. 2 onto a section of Y to Z of the inner face of the steering wheel rim encased in foam.

In FIG. 2b the transition can be seen between the segment sections 11 and 13 on the inner face of the steering wheel rim after the encasing with foam and covering with leather. The segments 11, which are illustrated in hatched form so as to be better distinguished, are suddenly no longer visible from the exterior towards the spoke 7 and are connected with each other by a segment 13, of which the upper edge and the lower edge are each given the reference number 13. The part 21 of the steering wheel skeleton forming the steering wheel rim runs beneath the segment 13. The foamed extension of a steering wheel spoke is designated by 37, which for better illustration is shown partially cut off. 39 designates the seam of the leather covering. In the encircled area W, the segment 13 is illustrated in section and rotated through 90°.

Figure 3:
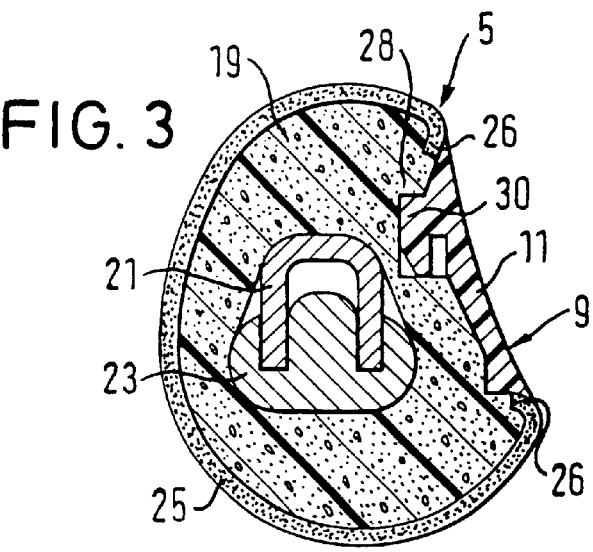
FIG. 3 shows a cross-section through the steering wheel rim according to the line III—III in FIG. 1.
Figure 4:
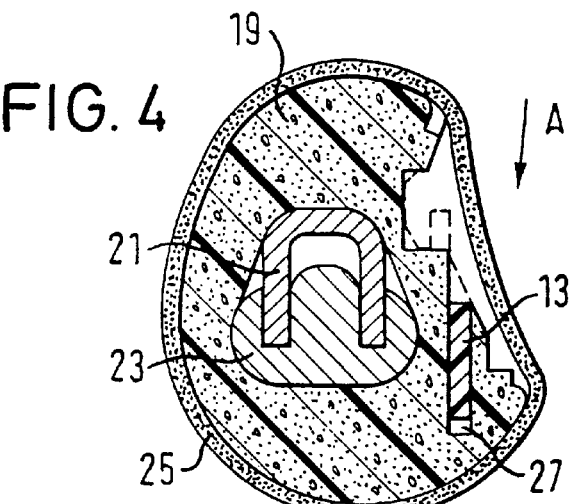
FIG. 4 shows a cross-section through the steering wheel rim in front of a spoke according to the line IV—IV according to FIG. 1.
Figure 5:
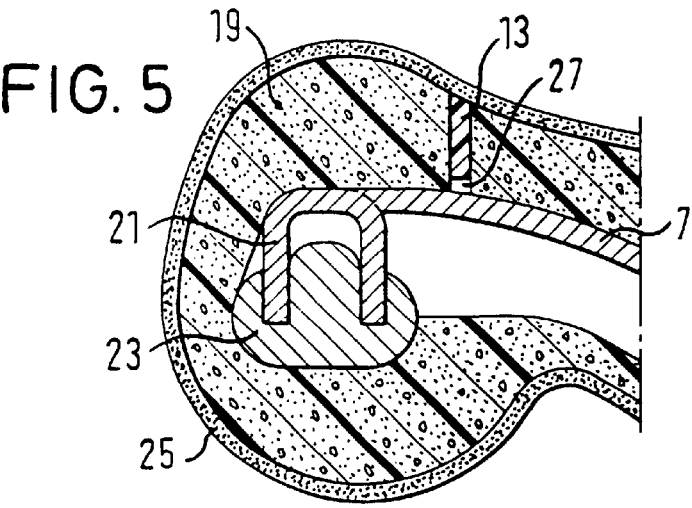
FIG. 5 shows a cross-section through the steering wheel rim in the region of the transition to a steering wheel spoke according to the line V—V in FIG. 1.

FIGS. 3 to 5 also show explicitly the foam casing 19 of the steering wheel rim, which also surrounds fully or partially the spokes 7 and if necessary can surround the steering wheel hub 3. On the rear or lower face of the steering wheel rim 21, an additional mass 23 is connected with the steering wheel rim 21, which is intended to increase the inert mass of the steering wheel rim. In FIG. 3 in cross-section the first segment section 11 is shown, which is visible on the inner face of the steering wheel rim 5 encased in foam. A leather covering 25 extends circumferentially up to the insert 9 and runs with its free edges 26 in the region of the transition to the insert 9 radially inwards.

FIG. 4 shows the transition of a first segment section 11 to a second segment section 13 immediately in front of a spoke 7. As the insert 9, on encasing the steering wheel skeleton 17 with foam, is not encased in foam, the foam surround 19 must already have corresponding recesses for the insert 9, so that the insert 9 is only pushed into these recesses. The second segment section 13 is inserted into a corresponding pocket-shaped recess 27 in the foam casing 19 in axial direction A and is practically embedded in the foam casing 19. The foam casing 19 has a projection 28 which represents a latching connection for the insert 9 because it forms an undercut in axial direction A and after insertion of the insert it engages thereon and strives to press the insert 9 in axial direction A, whereby a good fit in axial direction is the result. For this purpose, the insert likewise has a projection 30 on which the projection 28 of the foam casing 19 immediately engages. The leather covering 25 is closed peripherally and ensures that the second segment section 13 is not visible from the exterior.

FIG. 5 shows that the second segment section 13 in the region of the spoke 7 of the steering wheel skeleton runs above the spoke. The recess 27 in the foam casing 19, already shown in FIG. 4, runs accordingly above the spoke 7 of the steering wheel skeleton.

Here, also, the leather covering 25 covers the second segment section 13.

The production of the steering wheel according to the invention is explained briefly hereinbelow. After the production of the steering wheel skeleton 17, additional masses 23 are fastened to the steering wheel rim 21 of the skeleton 17. Then the steering wheel skeleton 17 is encased with foam, the shape being formed such that the recesses 27 are produced, which have already been explained. Now the steering wheel is covered with leather. The edges 26 which form the subsequent transition of the leather to the first segment sections 11, are glued during this. Then the insert 9 is pushed from the front face of the steering wheel in axial direction A into the recesses 27, a clip connection (not shown) between the steering wheel skeleton and the insert 9 being able to serve for the additional fixing of the insert 9 instead of or in addition to the latching connection which is formed by the projection 28 of the foam casing 19 and the projection 30 of the insert. This clip connection can be a connection between the steering wheel rim 21 of the steering wheel skeleton or the steering wheel spokes 29 of the skeleton with the insert 7. Finally, the leather is fastened in the region of the second segments 13, e.g. by gluing and sewing, so that the insert is not visible from the exterior in the region of the second segment sections 13. The edges 26 of the leather can also be clamped between the foam casing 19 and the insert 9.

In order to facilitate the insertion of the insert 9 into the foam casing 19, the second segment sections 13 have in cross-section an elongated profile in axial direction A, with a substantially cylindrical outer face and a substantially cylindrical inner face. Thereby, undercuts both on the insert 9 and also in the foam casing 19 are to be avoided, which would make its production difficult or impossible.

Figure 6:
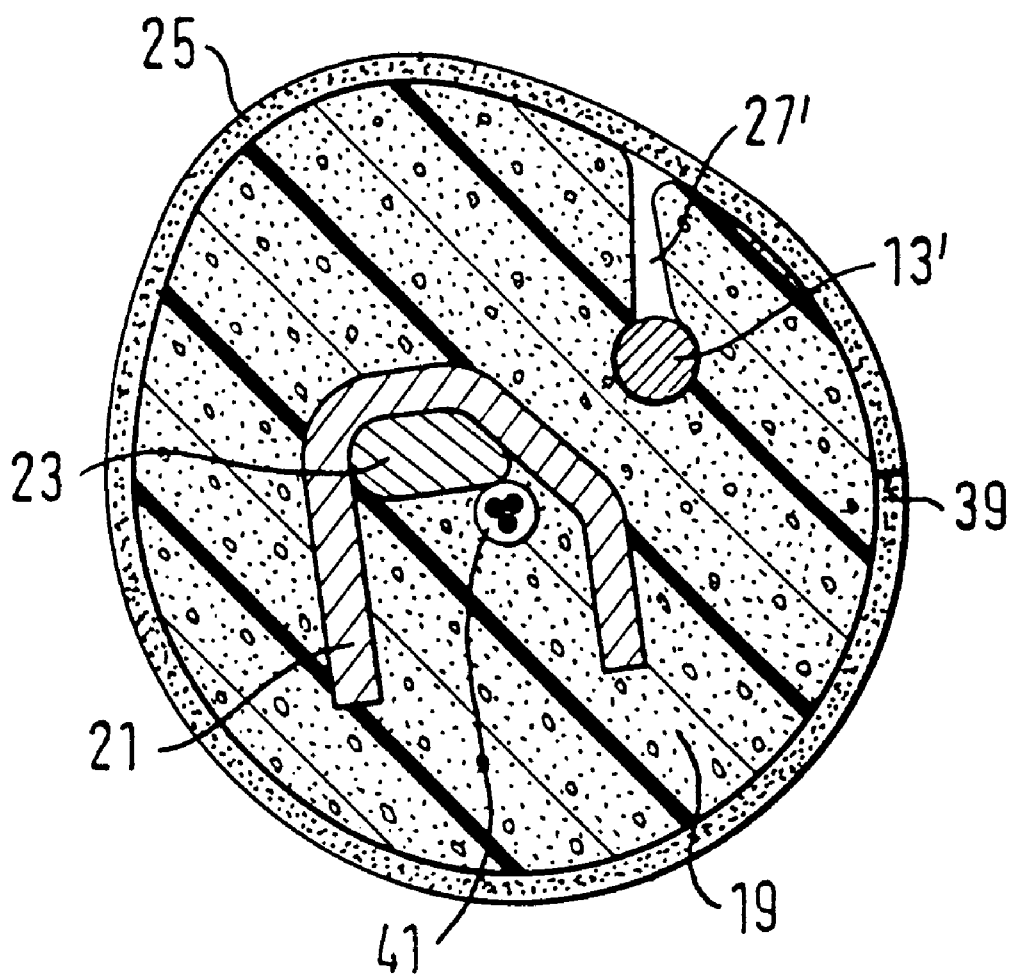
FIG. 6 shows a cross-section through a steering wheel rim according to another embodiment in front of a spoke.

The modified embodiment illustrated in FIG. 6 shows a cross-section through a steering wheel rim in the region in front of a spoke, i.e. in the region which is also illustrated in FIG. 4. In this embodiment, the segments 13, which are designated here by 13', are not elongated, but rather are oval to circular in cross-section. The recess 27' in the foam casing 19 is likewise pocket-shaped here, the recess 27' becoming wider towards the bottom, so that here also a latching connection results between the foam casing 19 and the segment 13'. Inside the steering wheel rim 21, i.e. the skeleton section of the steering wheel rim, a switch cable 41 is embedded into the foam casing 19 close to the additional mass 23.

What is claimed is:

1. A vehicle steering wheel, comprising:

a steering wheel hub having a central axis defining an axial direction, a steering wheel rim circumscribing said axis in a circumferential direction and having an inner face facing said steering wheel hub and an outer face facing away from said steering wheel hub, a foam casing engaging said steering wheel rim, at least one spoke connecting said steering wheel hub with said steering wheel rim, and an insert fastened in said steering wheel rim, said insert being visible from the exterior on at least one of said inner face and said outer face, said insert being a pre-manufactured ring closed in said circumferential direction, which has first segment sections on a periphery of said steering wheel rim, which are visible from said exterior, and has second segment sections alternating with said first sections, said second sections being not visible from said exterior and being embedded in said foam casing, said steering wheel rim having an inner annular skeleton which is embedded in said foam casing, said foam casing having an annular recess with a ring-shaped opening open in an axial direction and for receiving said insert into said recess in said axial direction.

2. The vehicle steering wheel according to claim 1, wherein said second segment sections are staggered radially with respect to said first segment sections.

3. The vehicle steering wheel according to claim 2, wherein said second segment sections run curved in an arc shape.

4. The vehicle steering wheel according to claim 1, wherein said second segment sections are staggered axially with respect to said first segment sections.

5. The vehicle steering wheel according to claim 4, wherein said second segment sections run curved in an arc shape.

6. The vehicle steering wheel according to claim 1, wherein said foam casing has recesses which are adapted to a shape of said insert such that said insert can be pushed into said recesses in said axial direction of said hub.

7. A steering wheel according to claim 1, wherein said second segments have a profile elongated in said axial direction, said recess having portions in which said second segments are arranged which portions are elongated in said axial direction.

8. The vehicle steering wheel according to claim 1, wherein said second segment sections have a profile which as seen in said axial direction is elongated in cross-section, said profile having a substantially cylindrical outer face and a substantially cylindrical inner face.

9. The vehicle steering wheel according to claim 1, wherein at least said steering wheel rim is covered with leather and said second segment sections are not visible from said exterior due to said leather covering of said steering wheel rim.

10. The vehicle steering wheel according to claim 1, wherein said second segment sections are provided in a region of a transition of said spokes to said steering wheel rim.

11. A steering wheel according to claim 1, wherein a leather covering said foam casing is provided, said leather closing said opening in a region of said second segments.

12. A vehicle steering wheel, comprising:

a steering wheel hub having an axial direction, a steering wheel rim having an inner and an outer face and being provided with a foam casing, at least one spoke connecting said steering wheel hub with said steering wheel rim, and an insert which is visible from the exterior on at least one of said inner face facing said steering wheel hub and said outer face facing away therefrom, said insert being a surrounding ring which has first segment sections on a periphery of said steering wheel rim, which are visible from said exterior, and has second segment sections alternating with said first sections, said second sections being not visible from said exterior and being embedded in said foam casing, said foam casing having recesses which are adapted to a shape of said insert such that said insert can be pushed into said recesses in said axial direction of said hub, said foam casing having a projection which forms a latching connection with said insert which is pushed into said recesses in said foam casing.

* * * * *